United States Patent

[11] 3,618,096

| [72] | Inventor | Hellmuth Schoneborn<br>Assling, Germany |
|---|---|---|
| [21] | Appl. No. | 874,818 |
| [22] | Filed | Nov. 7, 1969 |
| [45] | Patented | Nov. 2, 1971 |
| [73] | Assignee | Messerschmitt-Bolkow-Blohm, Gesellschaft<br>mit beschrankter Haftung<br>Munich, Germany |
| [32] | Priority | Nov. 26, 1968 |
| [33] | | Germany |
| [31] | | P 18 10 977.8 |

[54] METHOD AND APPARATUS FOR ELECTRONICALLY CAMOUFLAGING A MOVING MISSILE HAVING AN ACTIVE RADAR HOMING HEAD
10 Claims, 3 Drawing Figs.

[52] U.S. Cl............................................. 343/18 E, 343/7 ED
[51] Int. Cl........................................ G01s 9/02, H04k 3/00
[50] Field of Search............................................. 244/3.14, 3.19; 343/7 ED, 7 A, 18 E

[56] References Cited
UNITED STATES PATENTS

| 2,987,269 | 6/1961 | Weller | 343/7 ED |
| 3,290,681 | 12/1966 | Beteille | 343/18 E |

*Primary Examiner*—Malcolm F. Hubler
*Attorney*—McGlew & Toren

ABSTRACT: A method for electronically camouflaging a moving missile having an active radar homing head comprises utilizing a phantom transmitter, separate from the missile, to produce radar pulses having an operating wavelength differing only slightly from that of the radar homing head but having the same pulse recurrence frequency and a higher radiation power. The phantom transmitter is activated in advance of launching of the missile, and the radar homing head is activated after a predetermined flying time of the missile in a manner such that the transmission pulses from the phantom transmitter and those from the radar homing head arrive simultaneously at the target. The missile carries a receiver at the rear end tuned to the transmission frequency of the phantom transmitter, and circuitry connected to said receiver whereby the homing head produces radar pulses responsive to radar pulses received from the phantom transmitter. The circuitry includes a delay member, a ramp voltage generator and a release circuit, which are connected with a modulator controlling the radar homing head transmission, and the operability of the radar homing head is controlled by an additional transmit-receive switch.

PATENTED NOV 2 1971 3,618,096
SHEET 1 OF 2
Fig. 1
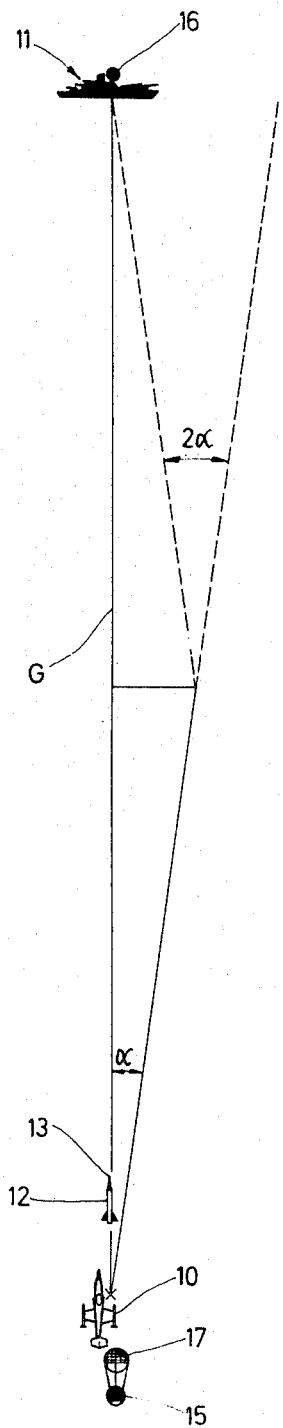
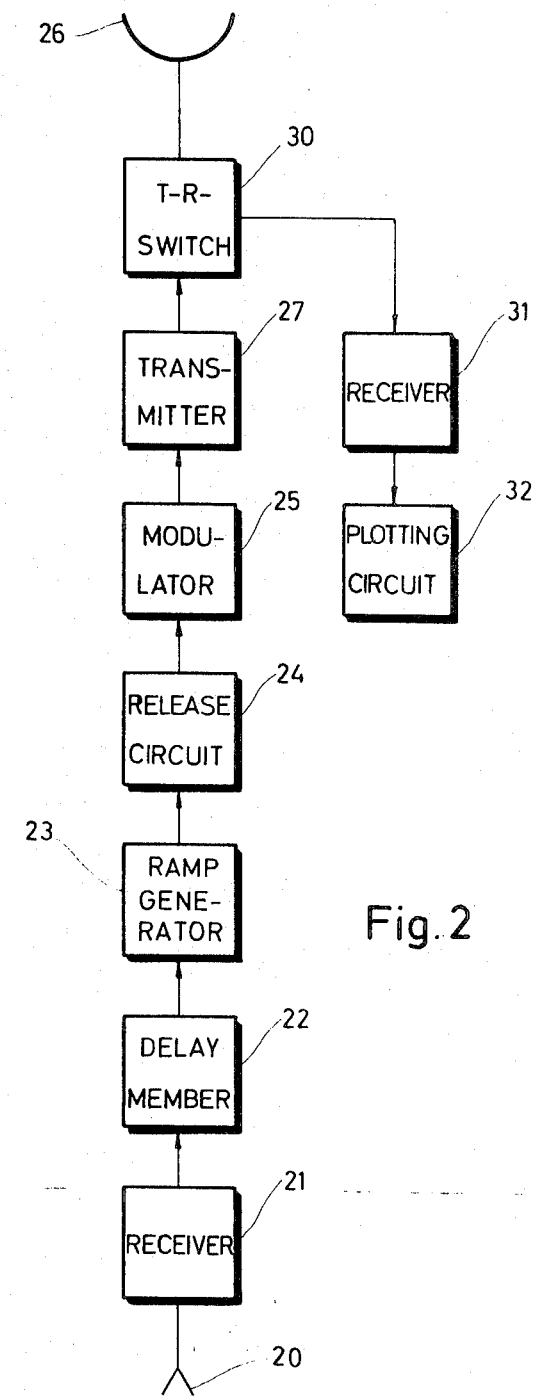
Fig. 2
INVENTOR
Hellmuth Schöneborn
By McGlew & Tuten
ATTORNEYS

METHOD AND APPARATUS FOR ELECTRONICALLY CAMOUFLAGING A MOVING MISSILE HAVING AN ACTIVE RADAR HOMING HEAD

BACKGROUND OF THE INVENTION

Self-steering missiles using an active radar homing head can be easily deflected from their target-following course, as experience has shown, by ECM (electronic countermeasures), for example, in a manner such that the target approached by the missile determines the transmission frequency of the measuring radar homing head and transmits high-frequency interference energy on this frequency with a high radiation power. The missile, thus disturbed, can determine changes in the course of the target but not the distance to the target, so that an impact between the missile and the target can no longer be achieved.

Devices for determining radar pulses of extraneous radar transmitters, and also for ascertaining their transmission and pulse recurrence frequencies and similar parameters, and for producing interfering pulses of equal parameters, have, in the meantime, become so lightweight and so small, due to integrated circuitry, that they can be carried even by relatively small targets, such as airplanes, in addition to the usual equipment. For example, see Aviation Week & Space Technology, for Jan. 1, 1968, pages 48 through 62. Due to this development of the electronic components, the location of targets from missiles, by means of active radar homing heads, has become practically impossible (due to the absence of distance information), particularly since the electric transmission powers installed in self-propelled missiles are still relatively low, so that supersensitive receivers must be used in the homing heads of these missiles. These can be blocked very easily by an enemy, using high-frequency energy, unless special measures are provided, for example, damping switches.

SUMMARY OF THE INVENTION

This invention relates to moving missiles having active radar homing heads and, more particularly, to a novel method of and apparatus for electronically camouflaging such a moving missile.

The objective of the invention is to eliminate the above-mentioned inconveniences by utilizing a new method and new apparatus for carrying out the new method for electronically camouflaging a moving missile with an active radar homing head, that is, for using suitable measures to keep a missile so hidden from an enemy that the missile does not betray itself by its own active radar radiation.

In accordance with this invention, camouflaging impulses, of an operating wavelength differing only slightly from the operating wavelength of the radar homing head, but of the same pulse recurrence frequency and possibly higher radiation power, are produced by means of a radar transmitter separated from the missile. This phantom transmitter is actuated before launching of the missile but sufficiently long before the missile radar is activated, and the pulses produced by the phantom transmitter are directed to the target to be reached by the missile. After a certain flying time of the missile, its radar homing head is activated in such a manner that the transmission pulses from the phantom transmitter and those from the transmitter of the radar homing head arrive simultaneously at the target.

An enemy thus will receive radar pulses of the phantom transmitter before the missile intended to collide with the target has been launched, and the enemy will analyze these pulses. After determining the operating wavelength, that is, the transmission frequency and, under certain circumstances, also the pulse recurrence frequency, he will set a so-called "spot jammer" to this frequency, this spot jammer producing, on this transmission frequency, sweep radiations of great power density. The frequency of the radar pulses received, and their pulse recurrence frequency, are constantly monitored and indicated, for example, on a cathode-ray tube.

Since the transmission pulses of the radar homing head, which is activated later, are received by the enemy simultaneously with the same pulse recurrence frequency, or an even-numbered portion thereof, as the transmission pulses of the phantom transmitter, and differ only slightly in their transmission frequency from those of the phantom transmitter, the enemy no longer has any way of recognizing the active transmitter of the radar homing head and of taking suitable countermeasures against the active radar homing head of the missile.

The frequency difference between the phantom transmitter and the transmitter of the radar homing head must be selected such that the receiver of the radar homing head must be free of the interfering frequency of the enemy, and hence of the transmission frequency of the phantom transmitter. This frequency difference must be determined after an analysis of the possible countermeasures of the enemy, which can be effected, for example, directly before the launching of the missile and after actuation of the missile radar if suitable electronic devices can be installed at the launching site of the missile.

In accordance with the preferred embodiment of the invention, release of the transmission pulses of the radar homing head is effected by transmission pulses of the phantom transmitter.

Apparatus for preforming the method includes a radar apparatus as a phantom transmitter, a receiver in the electronically camouflaged missile having the active radar homing head and tuned to the transmission frequency of the phantom transmitter, and a circuit arrangement connected to the receiver for generating radar pulses for transmission by the radar homing head in response to pulses received from the phantom transmitter.

Preferably, the circuit arrangement connected to the receiver includes a delay element, a ramp voltage generator and a release circuit which are connected with a modulator controlling the radar transmitter of the missile, with the operability of the latter being controlled by another switching element.

With a stationary, or slowly moving, launching pad for the missile to be camouflaged electronically, the phantom transmitter is installed on the launching pad. However, if the launching pad for the electronically camouflaged missile is installed in a rapidly moving vehicle, such as an airplane, the phantom transmitter preferably is carried by a balloon or is installed in a phantom missile (decoy) and can be ejected automatically from the carrying airplane after it has been activated but before the missile is launched.

The method and apparatus of the invention can be used successfully wherever observation and jamming stations are arranged identically with the target to be reached, or at least in the immediate proximity of the target. This is always the case in sea targets, as in ships, and in high-grade air targets, hence in high-performance combat planes. If the phantom transmitter, missile and target thus form a straight line or substantially a straight line, the emission of pulses from the phantom transmitter and from the transmitter of the radar homing device can always be so controlled that both transmission pulses arrive simultaneously at the target. The effects of any deviations from the straight line can be eliminated by increasing the duration of the pulses from the phantom transmitter, that is, certain time displacements of the transmission pulses of the radar homing head are covered by a greater width of the transmission pulses of the phantom transmitter.

An object of the invention is to provide an improved method of and apparatus for electronically camouflaging a moving missile having an active radar homing head.

Another object of the invention is to provide such a method and apparatus utilizing a phantom transmitter, separate from the missile, to produce radar pulses having an operating wavelength differing only slightly from the operating wavelength of the radar homing head.

A further object of the invention is to provide such a method and apparatus in which the phantom transmitter produces radar pulses having the same pulse recurrence frequency of the radar pulses produced by the homing head but a higher radiation power than the latter.

Another object of the invention is to provide such a method and apparatus in which the phantom transmitter is activated in advance of launching of the missile.

A further object of the invention is to provide such a method and apparatus in which the radar homing head is activated after a predetermined flying time of the vessel and in a manner such that the transmission pulses from the phantom transmitter and those from the radar homing head arrives simultaneously at the target.

For an understanding of the principles of the invention, reference is made to the following description of a typical embodiment thereof as illustrated in the accompanying drawing.

BRIEF DESCRIPTION OF THE DRAWINGS

FIG. 1 illustrates the geometric conditions, represented in a plane, of a phantom transmitter, a missile launching pad and a target equipped with electronic jamming devices;

FIG. 2 is a block circuit diagram of the circuit arrangement in the missile.

DESCRIPTION OF THE PREFERRED EMBODIMENT

Figure 3:
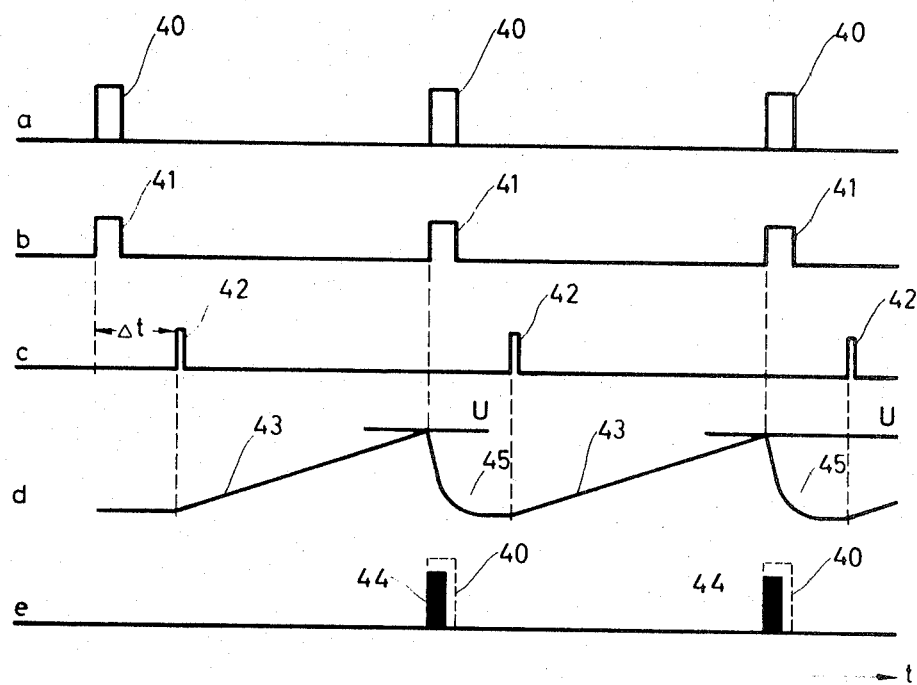
FIG. 3 is a pulse diagram explanatory of FIGS. 1 and 2.

In the battle situation represented in a plane in FIG. 1, the missile carrier is illustrated as an airplane 10 from which there is launched a missile 12 intended to collide with a moving target 11, for example, a ship. Missile 12 has an active radar homing head 13 whereby the missile steers itself into the target.

A phantom transmitter 15, arranged on or near the launching site X of the missile is designed, in a manner not herein described in detail, as a pulse transmitter and is directed toward the target 11. In the represented embodiment, phantom transmitter 15 is carried by a balloon 17 which is ejected automatically from carrier 10 after the phantom transmitter has been actuated but before the missile is launched. In the case of slowly moving carrier vehicles, for example, a ship or a land vehicle, or of a stationary launching pad, the phantom transmitter 15 naturally is installed on the ship or on the land vehicle, or stationary next to the launching pad.

In missile 12, there is provided a circuit arrangement illustrated in block form in FIG. 2. Referring to FIG. 2, an antenna 20 points to the carrier airplane, and hence to the rear with respect to missile 12. Pulses 41 of phantom transmitter 15 (see FIG. 3) received by antenna 20 are transmitted to a receiver 21 whose output pulses pass through a delay member 22 thus undergoing a delay $\Delta t$, and are released as pulses 42 (see FIG. 3) which release, in a ramp voltage generator 23, a ramp voltage 43 rising proportionately to the time. Delay member 22 is necessary in order to be able to bring the high ramp voltage 43 down to zero within a certain discharge time. In a release circuit 24 provided behind ramp voltage generator 23, ramp voltage 43 is compared with a fixed DC voltage U (see FIG. 3). If both voltages are equal, release circuit 24 emits a pulse which actuates a series-connected modulator 25 so that a transmitter 27 connected with a transmission antenna 26 of homing had 13 emits a transmission pulse 44. Transmission antenna 26 serves, simultaneously, as a receiving antenna, and is connected through a transmitting-receiving switch 30 with a receiver 31 to which is connected a plotting circuit 32. In plotting circuit 32, guiding signals are produced in dependence on the deviation of the missile from the charted course determined by the homing head, by means of which missile 12 steers itself into the target.

In the pulse chart illustrated in FIG. 3, pulses emitted by phantom transmitter 15 are designated 40, in curve $a$, and the pulses received by antenna 20 of missile 12 are indicated at 41 in curve $b$. Pulses 42, illustrated in curve $c$ and delayed by $\Delta t$, release ramp voltages 43, as illustrated in curve $d$ whose decays are illustrated at 45. Curve $e$ finally shows pulses 40 of phantom transmitter 15 arriving at the target simultaneously with pulses 44 from antenna 26 of homing head 13. It can also be seen, from the pulse chart, that the sum of $\Delta t$ and of the rise time of the ramp voltages up to the comparison voltage U must always be equal to the pulse recurrence time, that is, $\Delta t + t_{ramp} = 1/PRF$, where PRF denotes the pulse recurrence frequency.

Pulses 40 and pulses 44 will always arrive simultaneously at the target if the prerequisites represented in FIG. 1 are satisfied, namely, if the launching site X, phantom transmitter 15 and missile 12, as well as target 11 and its devices 16 for jamming active homing head 13 of missile 12, form a straight line G. However, this corresponds to a normal combat situation. The arrangement must be such that the travel differences of the radar pulses form phantom transmitter 15 and the active radar homing head 13 do not exceed the amount $\tau_1-\tau_2 \cdot 300m.$, where $\tau_1$ denoted the duration of camouflaging pulse and $\tau_2$ the duration of a homing head pulse, both measured in $\mu sec$. If $\tau_1$ is 1.5 $\mu sec.$, for example, and $\tau_2$ equals 0.5 $\mu sec.$, and the maximum travel distance is 300 m., there is obtained, with a missile range of 30 km., a travel difference of 1 percent. This maximum possible value will not be achieved, however, in practice, since it means, with this range, a distance difference angle $\alpha=8°$ This is too large, because of the desired target-pointing trajectory of the missile and the scanning possibility of the homing head antenna, arranged on the missile. Homing head 13 would otherwise lose target 11 from the field of view.

Slight deviations from the straight line, of the launching site and of the location of phantom transmitter 15, can be eliminated in a simple manner by increasing the pulse time of the phantom transmitter, as will be apparent from curve $e$ of FIG. 3.

While a specific embodiment of the invention has been shown and described in detail to illustrate the application of the principles of the invention, it will be understood that the invention may be embodied otherwise without departing from such principles.

What is claimed is:

1. A method for a electronically camouflaging a moving missile having an active radar homing head, said method comprising the steps of utilizing a phantom transmitter, separate form the missile, to produce radar pulses having an operating wavelength differing only slightly from the operating wavelength of the radar homing head but having the same pulse recurrence frequency as the latter and a higher radiation power; activating the phantom transmitter in advance of launching of the missile; and activating the radar homing head after a predetermined flying time of the missile in a manner such that the transmission pulses from the phantom transmitter and those from the radar homing head arrive simultaneously at the target.

2. A method as claimed in claim 1, including the step of adjusting the widths of the transmission pulses of the phantom transmitter in dependence on the respective admissible distance difference between the camouflaged missile and the phantom transmitter.

3. A method as claimed in claim 1, including effecting release of transmission pulse from the radar homing head responsive to receipt, by the missile, of transmission pulses of the phantom receiver.

4. A method as claimed in claim 1, including the steps of analyzing transmission frequencies of electronic jamming devices associated with the missile target; and after such analysis setting the operating wavelengths of the phantom transmitter and the transmitter of the radar homing head.

5. Apparatus for electronically camouflaging a moving missile having an active radar homing head, said apparatus comprising, in combination, a phantom transmitter, in the form of a radar apparatus, separate from the missile and producing radar pulses having an operating wavelength differing only slightly from the operating wavelength of the radar homing head but having the same pulse recurrence frequency as the latter and a higher radiation power; a receiver carried by said missile and tuned to the transmission frequency of said phantom transmitter; and circuit means connected to said receiver and operable, subsequently to activation of said phantom transmitter and after a predetermined flying time of the missile, to activate said radar homing head.

6. Apparatus as claimed in claim 5, in which said phantom transmitter is installed on the site of the launching pad of the missile to be electronically camouflaged.

7. Apparatus, as claimed in claim 5, in which said phantom transmitter is carried by a flying body ejected automatically from a missile carrier at substantially the time of launching of the missile from the carrier.

8. Apparatus as claimed in claim 5, in which said circuit means includes means operable to produce radar pulses from said radar homing head responsive to receipt of transmitted pulses from said phantom transmitter.

9. Apparatus claimed in claim 8 in which said circuit means includes a delay member connected to the output of said receiver; a ramp voltage generator connected to said delay member; a release circuit connected to said ramp voltage generator; and a modulator connected to said release circuit and controlling the radar transmitter of the missile.

10. Apparatus as claimed in claim 9, including an additional switching element connected to the radar transmitter of the missile and controlling the operability thereof.

* * * * *